M. FROESE.
SUPPORTER.
APPLICATION FILED NOV. 15, 1913.

1,208,768.

Patented Dec. 19, 1916.

Witnesses:
Harry G. Fleischer
F. George Barry

Inventor:
Minna Froese
by her attorneys
Brown & Seward

UNITED STATES PATENT OFFICE.

MINNA FROESÉ, OF NEW YORK, N. Y., ASSIGNOR TO JOHN A. PRINCE, OF NEW YORK, N. Y.

SUPPORTER.

1,208,768.      Specification of Letters Patent.      Patented Dec. 19, 1916.

Application filed November 15, 1913. Serial No. 801,312.

*To all whom it may concern:*

Be it known that I, MINNA FROESÉ, a citizen of the United States, and resident of the borough of Manhattan, in the city and State of New York, have invented a new and useful Improvement in Supporters, of which the following is a specification.

The object of this invention is to provide a supporter for wearing apparel, such as collars, which will be light and flexible, and one that will hold the material in perfect form.

A further object is to provide a means formed in the supporter for attaching the same to the material.

A still further object to provide a means formed in the supporter for stiffening the material at the top and bottom as well as serving to secure the supporter to the material and also to prevent the extremities of the same from injuring the material or breaking therethrough.

Figure 1:
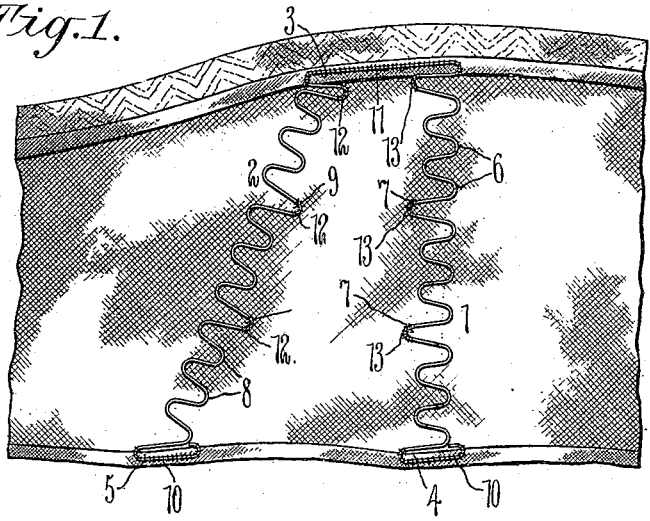
Figure 2:
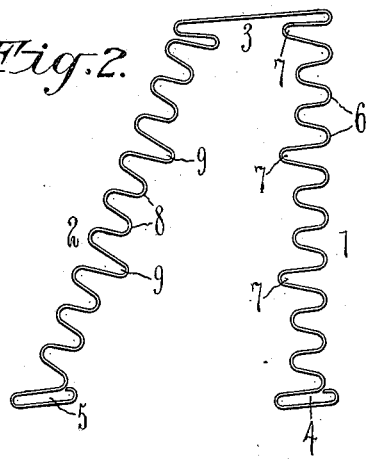

A practical embodiment of my invention is represented in the accompanying drawings, in which, Figure 1 represents an elevation of my device secured to the inside of a portion of a collar, and Fig. 2 represents an elevation of my supporter detached from the collar.

The supporter comprises a vertical member 1, a diagonal member 2, and a straight member 3, which member 3 is preferably formed diagonal. At the bottom of the member 1, there is formed a transversely elongated attaching loop 4. A transversely elongated attaching loop 5 is also formed integral with the diagonal member 2.

The vertical member 1 is crimped throughout its length, as shown at 6, and is also provided with a series of extended attaching loops 7. The diagonal member 2 is also crimped throughout its length, as shown at 8, and is also provided with a series of extended attaching loops 9.

The supporter is secured to the material at its lower edge, by the transversely elongated attaching loops 4 and 5, which are sewed thereto as shown at 10, and at the upper edge by the straight diagonal member 3, which is sewed thereto, as shown at 11. The intermediate portion of the members 1 and 2 are sewed at 12, 13, through the extended attaching loops 9 and 7. Thus it will be seen that the elongated attaching loops 4 and 5 provide a very wide bearing when sewed to the lower edge of the collar and the straight diagonal attaching member forms a very wide bearing when sewed to the upper edge of the collar, which bearings not only serve to hold the collar in perfect form, but also prevent the ends from breaking through the material of the collar.

I have represented the supporter as being formed of wire, but it may be composed of celluloid or other light suitable material.

What I claim is:

A supporter comprising a crimped vertical member having a series of open extended attaching loops and a transversely elongated closed loop, a crimped diagonal member having a series of open extended attaching loops and a transversely elongated closed loop, and a straight diagonal attaching member having transversely elongated attaching loops oppositely disposed and interposed between the vertical and diagonal members and the straight attaching member.

In testimony, that I claim the foregoing as my invention, I have signed my name in presence of two witnesses, this twenty-ninth day of October, 1913.

MINNA FROESÉ.

Witnesses:
F. GEORGE BARRY,
HENRY C. THIEME.

Copies of this patent may be obtained for five cents each, by addressing the "Commissioner of Patents, Washington, D. C."